United States Patent [19]

Ito et al.

[11] Patent Number: 4,933,851
[45] Date of Patent: Jun. 12, 1990

[54] METHOD OF AND APPARATUS FOR CONTROLLING MOTOR VEHICLE DURING SPEED CHANGE OPERATION

[75] Inventors: Yasunobu Ito, Okazaki; Kenji Suzuki, Handa, both of Japan

[73] Assignee: Aisin AW Kabushiki Kaisha, Japan

[21] Appl. No.: 207,721

[22] Filed: Jun. 16, 1988

[30] Foreign Application Priority Data

Jun. 26, 1987 [JP] Japan .................... 62-157558

[51] Int. Cl.$^5$ .................. B60K 41/18; B60K 41/10
[52] U.S. Cl. .................... 364/424.1; 74/857; 74/858; 192/0.032; 192/0.034
[58] Field of Search ............ 364/424.1; 74/857, 858; 192/0.032, 0.034

[56] References Cited

U.S. PATENT DOCUMENTS

| 4,266,447 | 5/1981 | Heess et al. | 74/858 |
| 4,403,527 | 9/1983 | Mohl et al. | 74/858 |
| 4,456,107 | 6/1984 | Ito et al. | 192/3.31 |
| 4,486,838 | 12/1984 | Itoh et al. | 364/424.1 |
| 4,677,880 | 7/1987 | Hattori et al. | 74/858 |
| 4,680,988 | 7/1987 | Mori | 364/424.1 |
| 4,707,789 | 11/1987 | Downs et al. | 364/424.1 |
| 4,714,144 | 12/1987 | Speranza | 364/424.1 |
| 4,722,242 | 2/1988 | Miura et al. | 74/695 |
| 4,744,031 | 5/1988 | Takeda et al. | 364/424.1 |
| 4,770,064 | 9/1988 | Kuerschner | 74/858 |
| 4,783,743 | 11/1988 | Yashiki et al. | 364/424.1 |

Primary Examiner—Parshotam S. Lall
Assistant Examiner—Christopher L. Makay
Attorney, Agent, or Firm—Lorusso & Loud

[57] ABSTRACT

In engine torque control in a motor vehicle having an engine and a stepping type of transmission, input and output speeds of the transmission are constantly detected by sensors disposed in input and output portions of the transmission, thereby obtaining a gear ratio (measured value) of the transmission. If the ratio of the difference between this gear ratio and a predetermined gear ratio before the gearshift (theoretical value) to the latter gear ratio before the gearshift exceeds a predetermined value, the start of gearshift is decided. If the ratio of the difference between the gear ratio of the transmission (measured value) and a predetermined gear ratio after the gearshift (theoretical value) to the latter gear ratio after the gearshift becomes smaller than a predetermined value, the end of gearshift is decided. A set level by which the torque of the engine should be reduced during the period between the start and end of the gearshift is determined by reading reduction data previously set with respect to the throttle opening and the type of gearshift. The torque output from the engine is reduced on the basis of the reduction data by controlling the ignition timing retardation angle or the fuel injection rate.

7 Claims, 6 Drawing Sheets

※ GEAR RATIO $i(t) = \dfrac{Ni}{No}$

Fig. 5

GEAR RATIO DATA

| GEAR | DATA |
|---|---|
| 1st SPEED | 3.50 |
| 2nd SPEED | 2.45 |
| 3rd SPEED | 1.00 |
| 4th SPEED | 0.79 |

Fig. 6(a)

ENGINE TORQUE REDUCTION DATA

| THROTTLE OPENING | TYPES OF SHIFT | REDUCTION DATA |
|---|---|---|
| $\theta_0$ | 1→2 | 01 ※ |
|  | 2→3 | 01 |
|  | 3→4 | 02 ※ |
|  | 4→3 | 02 |
|  | 3→2 | 01 |
|  | 2→1 | 01 |
| $\theta_1$ | 1→2 | 01 |
|  | 2→3 | 02 |

(EXAMPLE)

※01=10%(REDUCTION RATE)

4 SPEED (U/D)

| | | MAIN TRANSMISSION MECHANISM PORTION 21 | | | | | | | SUB TRANSMISSION MECHANISM PORTION 22 | | |
|---|---|---|---|---|---|---|---|---|---|---|---|
| | | C1 | C2 | B1 | B2 | B3 | F1 | F2 | C3 | B4 | F3 |
| P | | | | | | | | | | ○ | |
| R | | | ○ | | ○ | | | | | ○ | |
| N | | | | | | | | | | ○ | |
| D | 1 | ○ | | | | | ○ | | | ○ | ○ |
| | 2 | ○ | | | ○ | | ○ | | | ○ | ○ |
| | 3 | ○ | | | ○ | | ○ | | ○ | | |
| | 4 | ○ | ○ | | (○) | | | | ○ | | |
| 3 | 1 | ○ | | | | | ○ | | | ○ | ○ |
| | 2 | ○ | | | ○ | | ○ | | | ○ | ○ |
| | 3 | ○ | ○ | | (○) | | | | | ○ | ○ |
| 2 | 1 | ○ | | | | | ○ | | | ○ | ○ |
| | 2 | ○ | | ○ | ○ | | ○ | | | ○ | ○ |
| 1 | 1 | ○ | | | | ○ | | ○ | | ○ | ○ |

METHOD OF AND APPARATUS FOR CONTROLLING MOTOR VEHICLE DURING SPEED CHANGE OPERATION

BACKGROUND OF THE INVENTION

This invention relates to a method of controlling a motor vehicle during speed change operations and an apparatus for performing this control and, more particularly, to engine torque control for avoiding gearshift shock when the speed of a stepping-type transmission is changed.

A method in which the torque output from an engine of a vehicle with an automatic stepping transmission placed at and connected to the rear end thereof is reduced during a gearshift operation in order to avoid gearshift shock is known (hereinafter referred to as engine torque control). Examples of this method are disclosed in U.S. Pat. No. 4,266,447 [German Pat. No. 2848624, European Pat No. 11088, Japanese Patent Laid-Open No. 55(1980)-69738].

These examples of the conventional control method make use of a particular type of system for reducing the output torque during gearshift in which the engine revolutions is detected when the need for a gearshift operation is determined; values representing the engine revolutions at which the engine torque control should be started and terminated are set by calculation of such parameters as the gear ratios before and after the selected gearshift operation; and the engine torque control is started and terminated when the engine speeds actually reach the set values. It is preferable that the timing of the start or end of the engine torque control to be made to coincide with the timing of the start or end of the gearshift operation, and the system is designed to predict and set the requisite values for effecting this coincidence.

It is possible that this conventional method may be effective in terms of a reduction in the magnitude of gearshift shock as originally intended under certain limited conditions. In general, however, this method experiences the following problems:
(1) It is difficult to control a gearshift operation with consistent accuracy under the influence of variations in the vehicle speed and the state of acceleration after the setting of the engine revolutions at which the engine is assumed to rotate at the start and end of the gearshift operation. Such influence cannot be avoided so long as the method is based on this prediction-based control.
(2) The engine revolutions is a substitute characteristic in terms of the detection of a transient state brought about by a gearshift operation, and engine revolutions involves slipping rotation of the torque converter. Control based on this factor is defective in terms of detection of such a transient state, as well as in terms of the response characteristics if it is effected with respect to a range of operation in which changes in the engine revolutions are gradual and small, in particular when operating with a small load and a low vehicle speed. It is therefore difficult to achieve engine torque control with a high degree of accuracy.

SUMMARY OF THE INVENTION

It is therefore an object of the present invention to provide a method of controlling a motor vehicle during speed change operation and an apparatus for performing this control, the apparatus and method being free from the above-described problems and being capable of uniformly reducing gearshift shocks under all possible operating conditions.

To attain this object, in the control of a motor vehicle during gearshift operations in accordance with the present invention, a gear ratio of a transmission is calculated from the number of transmission input revolutions and the number of transmission output revolutions; the start and end of each gearshift operation are decided on the basis of the calculated gear ratio; a set level by which the torque of the engine should be reduced during the period between the start and end of the gearshift operation is determined; and the torque output from the engine is reduced on the basis of this set level.

The number of transmission input revolutions and the number of transmission output revolutions are constantly detected by sensors disposed at input and output stages of the transmission, thereby obtaining a transmission gear ratio (measured value). If the ratio of the difference between this gear ratio and a predetermined gear ratio before the gearshift (theoretical value) to the latter gear ratio before the gearshift exceeds a predetermined value, the start of gear shifting is decided. If the ratio of the difference between the gear ratio of the transmission (measured value) and a predetermined gear ratio after the gearshift (theoretical value) to the latter gear ratio after the gearshift becomes smaller than a predetermined value, the end of the gearshift is decided.

A set level by which the torque of the engine should be reduced during the period between the start and end of the gearshift operation is determined by reading reduction data which is previously set with respect to the throttle opening TH and the type of gearshift (SHIFT). The torque output from the engine is reduced on the basis of the reduction data by controlling the ignition timing retardation angle or the fuel injection rate.

This arrangement of the present invention ensures the following advantages:
(1) In the engine torque control during gearshift operations, the torque is controlled in a real time manner on the basis of the rotational speeds of rotary members of the transmission, thereby enabling the transient state of shifting to be ascertained with accuracy.
(2) The gear ratio is constantly detected in a real time manner during a shift operation, which is different from prediction-based control at the time of shift decision, and the engine torque control is conducted on the basis of the detection of the gear ratio, thereby enabling the torque to be controlled without being affected by conditions relating to variations in the vehicle speed or specifically to the state of acceleration or deceleration during running over a sloping road.
(3) In accordance with the conventional engine torque control method, the control based on the engine revolutions involves the factor of slipping rotation of the torque converter. It is therefore difficult for the conventional method to ensure suitable control performance in terms of detection of a transient state of shifting, as well as in terms of the response characteristics it is effected with respect to a range of operation in which changes in the engine revolutions are gradual and small, in particular when operating with a small load and a low vehicle speed. In contrast, in the engine torque control method, the gear ratio is detected in a real time manner and, therefore, the engine torque can be controlled with accuracy and uniformly over the entire control range.

DESCRIPTION OF THE PREFERRED EMBODIMENT

A preferred embodiment of the present invention will be described below in detail with reference to the accompanying drawings.

Figure 1:
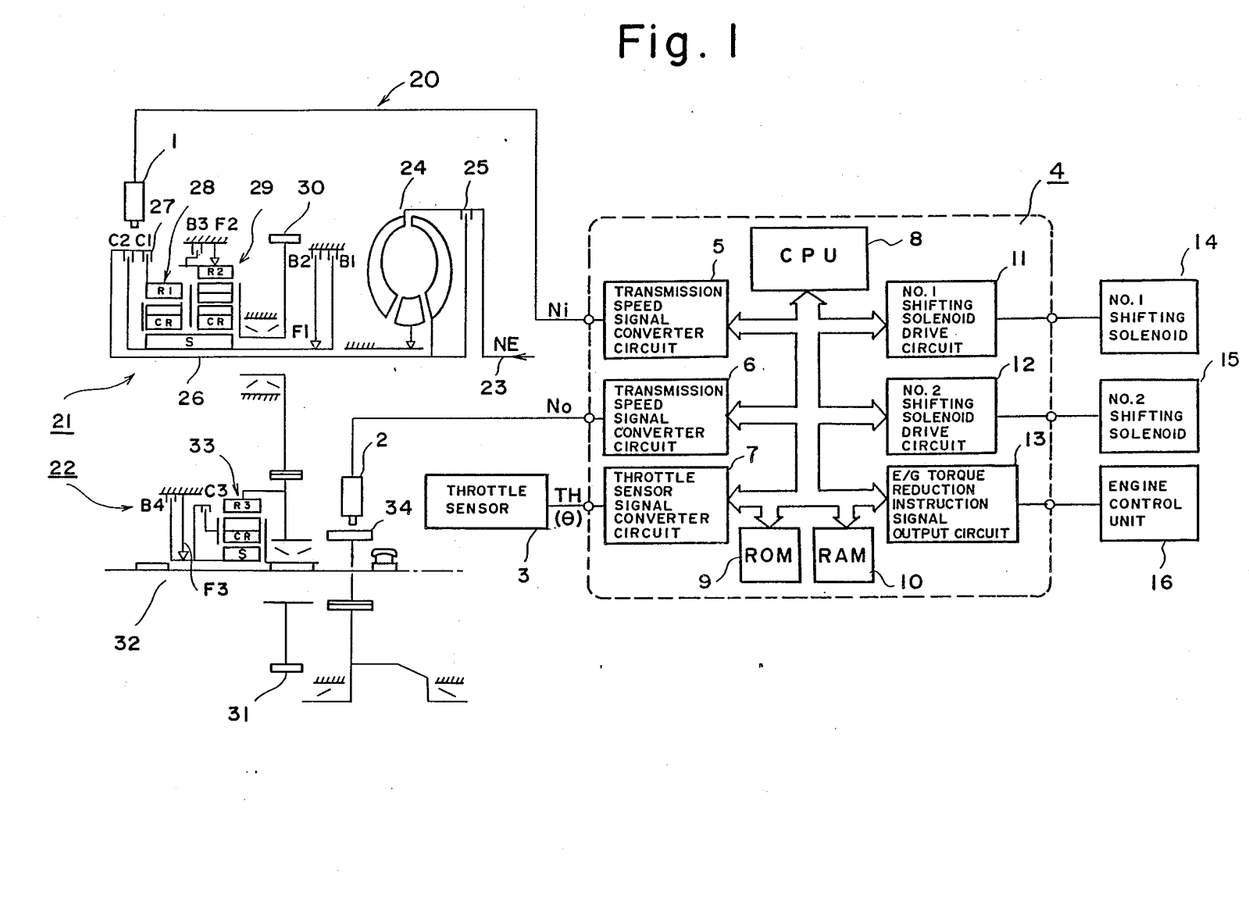
FIG. 1 is a block diagram of a system for controlling a motor vehicle during gearshift operation which represents an embodiment of the present invention.

Referring to FIG. 1, three sensors are provided. That is, a transmission input speed sensor 1 is adapted to detect the number of revolutions of a rotary member in a transmission input portion (which will be described later in detail); a transmission output speed sensor 2 detects the number of revolutions of a rotary member in an transmission output portion; and a throttle position sensor 3 (hereinafter referred to as "throttle sensor") detects the opening of a throttle of the engine. An electronic control unit 4 (hereinafter referred to as "ECT") has: a converter circuit 5 connected to the transmission input speed sensor 1 and adapted to process signals supplied therefrom; a converter circuit 6 connected to the transmission output speed sensor 2 and adapted to process signals supplied therefrom; a converter circuit 7 connected to the throttle sensor 3 and adapted to process signals supplied therefrom; a CPU (Central Processing Unit) 8; a ROM (Read Only Memory) 9 in which control programs and various items of data are stationarily stored; and a RAM (Random Access Memory) 10 in which data read from the ROM 9 and temporary input-output data are stored. The CPU 8 executes control programs stored in the ROM 9 such as those shown in FIGS. 3 to 5, thereby performing engine torque control. The electronic control unit 4 also has a first drive circuit 11 for driving a first shifting solenoid 14, a second drive circuit 12 for driving a second shifting solenoid 15, and an output circuit 13 which outputs an engine torque reduction instruction signal to an engine controlling unit 16 (hereinafter referred to as "ECU").

A transmission 20 has a main transmission mechanism (three speed automatic transmission mechanism) portion 21 and a sub transmission mechanism portion 22. Components of the transmission are disposed as described below. A shaft 23 connected to a crankshaft of the engine, a hydrodynamic torque converter 24, a lock-up clutch 25, an input shaft 26 are successively disposed from a side of the engine. A first (forward) clutch $C_1$ has a drum 27 directly connected to the input shaft 26. A single gear unit 28 has a sun gear S hollowed in the axial direction, a ring gear $R_1$, and a carrier CR which supports a pinion meshing with these gears. A dual gear unit 29 has a sun gear S hollowed in the axial direction, a ring gear $R_2$, and a carrier CR which supports a pinion meshing with the sun gear S and a pinion meshing with the ring gear $R_2$ so that these pinions mesh with each other. A counter drive gear 30 is coupled with both the carriers CR by means of splines. A counter driven gear 31 meshes with the counter drive gear 30 while being rotatably supported by a bearing. A planetary gear unit 33 provided around a counter shaft 32 comprises a sun gear S, a carrier CR which supports a pinion and which is connected via the counter shaft 32 to a differential drive pinion 34 provided as an output gear, and a ring gear $R_3$ which is integrally connected to the counter driven gear 31. There are also provided a second (direct) clutch $C_2$, a first brake $B_1$, a first one-way clutch $F_1$, a second brake $B_2$, a third brake $B_3$, a second one-way clutch $F_2$, a fourth one-way clutch $F_3$, and a fourth (U/D (underdrive) direct) clutch $C_3$, and a fourth (U/D) brake $B_4$.

Figure 8:
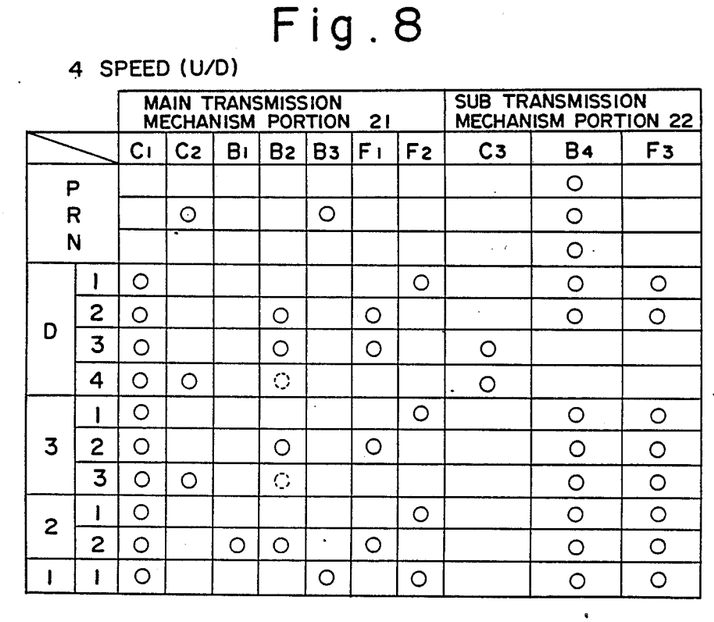
FIG. 8 is a table of the states of operations of respective elements of the transmission.

In the thus-constructed transmission, a forward three speeds and one reverse speed are obtained by the actuation of the clutches $C_1$ and $C_2$, the brakes $B_1$ to $B_3$ and one-way clutches $F_1$ and $F_2$ in the main transmission mechanism portion 21 in accordance with the operation table shown in FIG. 8, and rotation at a speed selected from these speeds is transmitted from the counter drive gear 30 to the counter driven gear 31 of the sub transmission mechanism portion 22. At the sub transmission mechanism portion 22, output is shifted by two between the direct connection and U/D by the actuation of the clutch $C_3$, the brake $B_4$ and the one-way clutch $F_3$ in accordance with the operation table shown in FIG. 8.

The transmission input speed sensor 1 is of an electromagnetic pick-up type, and a detecting portion of the sensor 1 is positioned such that it faces a circumferential portion of the drum 27 of the first (forward) clutch $C_1$ in order to detect the number of revolutions thereof. The drum 27 corresponds to the abovementioned rotary member in the transmission input portion. The case of the sensor 1 is attached to the casing of the transmission 20. Also, the transmission output speed sensor 2 is of an electromagnetic pick-up type, and a detecting portion of the sensor 2 is positioned such that it faces a circumferential portion of the differential drive pinion 34, namely, the output gear in order to detect the number of revolutions thereof. The differential drive pinion 34 corresponds to the above-mentioned rotary member in the transmission output portion. The case of the sensor 2 is attached to the casing of the transmission 20.

Figure 2A:
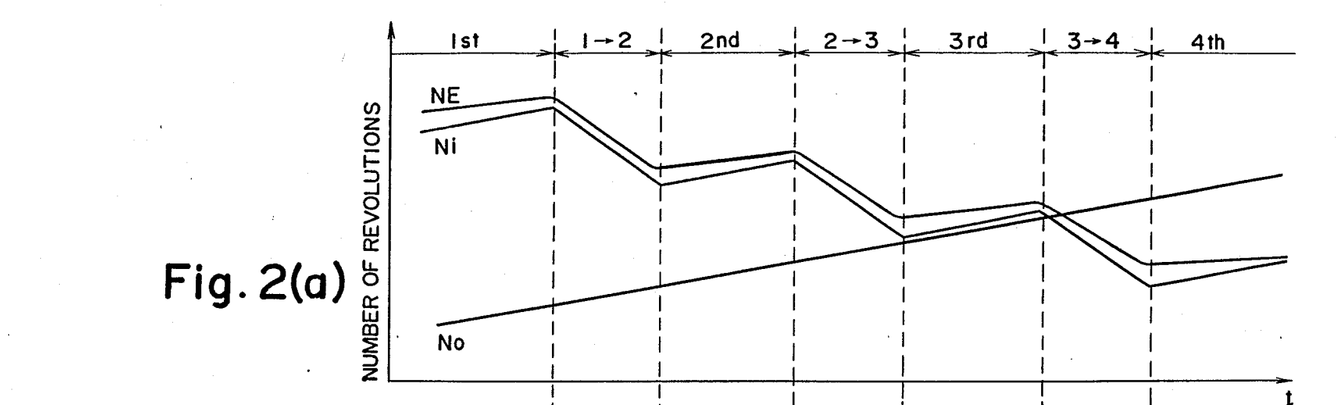
FIGS. 2(a) and 2(b) are diagrams of transient shifting characteristics.
Figure 2B:
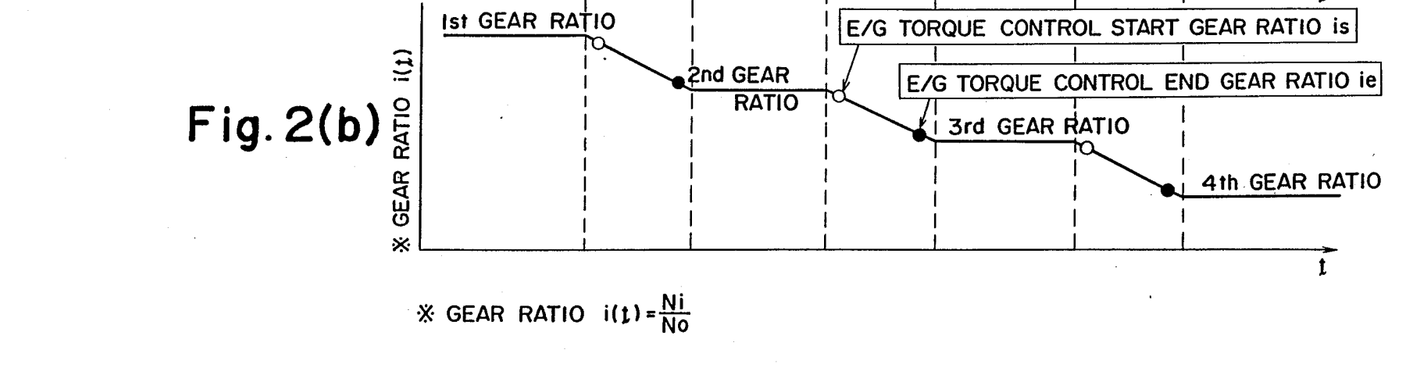

FIGS. 2(a) and 2(b) are diagrams of transitional gearshift characteristics. FIG. 2(a) shows the number of revolutions $N_E$ of the engine and the number of transmission input revolutions $N_i$, and the number of transmission output revolutions $N_o$, while FIG. 2(b) shows a gear ratio $i(t) = N_i/N_o$ calculated from the number of transmission input revolutions $N_i$ and the number of transmission output revolutions $N_o$. As is apparent from the figure, there is a difference between the number of engine revolutions $N_E$ and the number of transmission input revolutions $N_i$. It is therefore more practical to select the number of transmission input revolutions $N_i$ as data for control during shifting instead of the number of engine revolutions $N_E$, enabling the control to be optimized. If, as shown in FIG. 2(b), the gear ratio i is taken in real time manner to perform control during the shift from the second speed to the third speed, the engine torque control is started at a gear ratio $i_s$ and it is terminated at a gear ratio $i_e$. Thus, the control during shifting can be performed in correspondence with the actual speed of the vehicle.

Figures 3, 4:
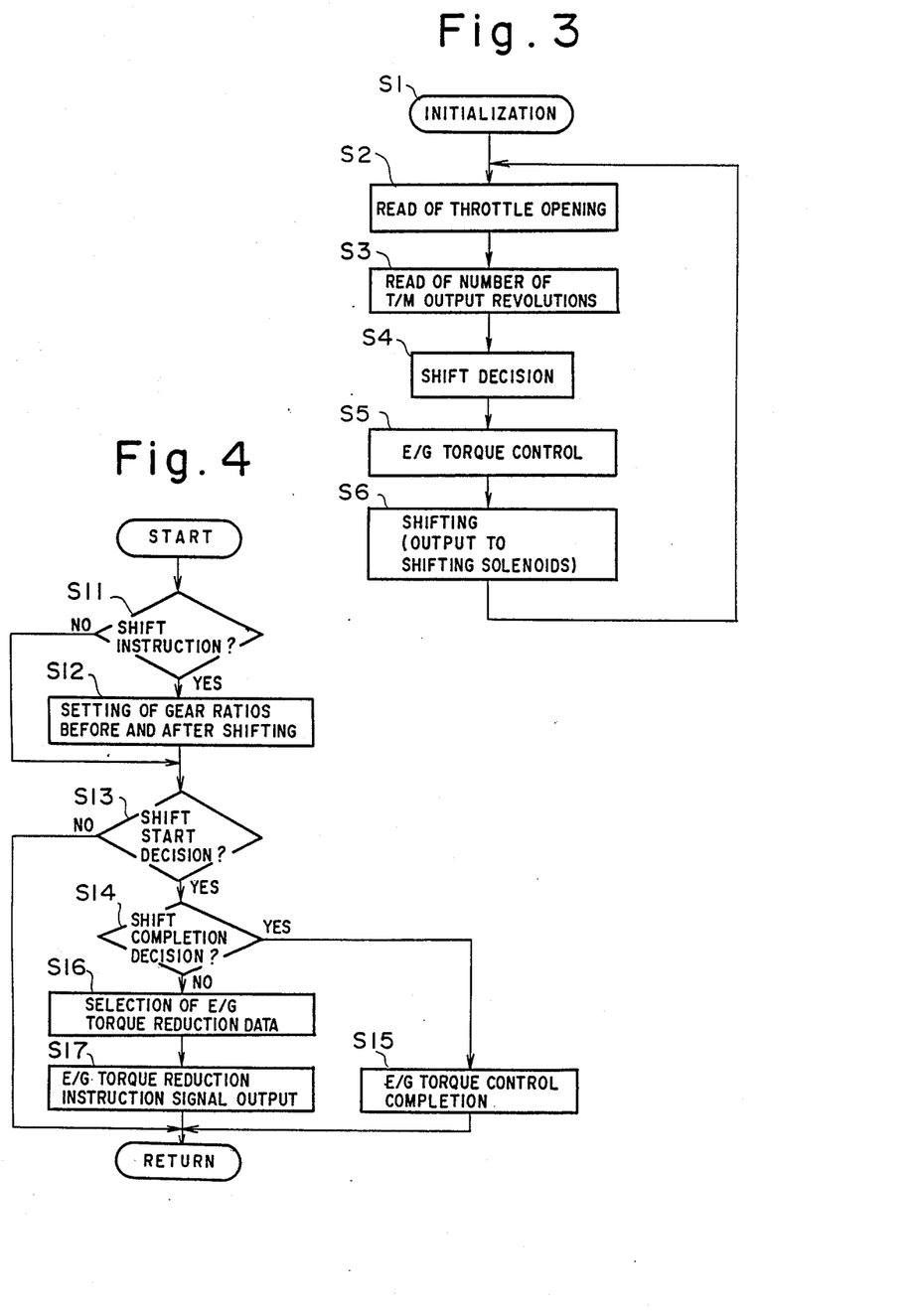
FIG. 3 is a schematic flow chart of the procedure of control during gearshift operation.
FIG. 4 is a schematic flow chart of the procedure of engine torque control.

The procedure of control during shifting in a motor vehicle in accordance with the present invention will be schematically described with reference to FIGS. 1 and 3.

Figure 7:
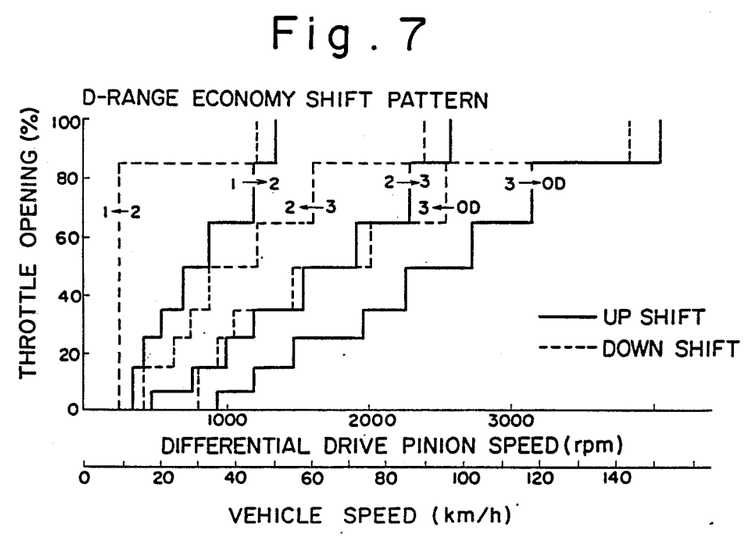
FIG. 7 is a shift pattern diagram showing D-range economy shift patterns.

In step S1, initialization is first effected. In step S2, a throttle opening $\theta$ detected by the throttle sensor 3 is supplied to the ECT 4 via the throttle sensor signal converter circuit 7 and is stored in the RAM 10. Next, in step S3, the number of transmission output revolutions $N_0$ detected by the transmission output speed sensor 2 is supplied to the ECT 4 via the transmission speed signal converter circuit 6 and is stored in the RAM 10. The throttle opening $\theta$ and the number of transmission output revolutions $N_0$ are constantly detected while the diagram of the throttle opening $\theta$ and the number of transmission output revolutions $N_0$ with respect to various types of shift (refer to FIG. 7) stored in the ROM 9 is referred to, thereby performing shift determination in step S4. Instead, the shift determination may be performed by detecting whether or not there is a change in a shift signal output from a shift switch which opens or closes in response to the spool position of a shift valve. In step S5, engine torque control (refer to subroutine shown in FIG. 4). In step S6, a shifting operation, that is, output to the shifting solenoids is effected.

Next, the procedure of engine torque control (step S5) will be schematically described with reference to FIG. 4.

First, in step S11, whether or not any shift instruction has been given is checked. In the case of Yes, gear ratios before and after the desired shift are set in step S12. Then, in step S13, whether or not a decision of shift starting has been made is checked. In the case of Yes, whether or not a decision of shift termination has been made is checked in step S14. In the case of Yes, the engine torque control is terminated in step S15. If no decision of shift termination has been made, one of items of engine torque reduction data (FIG. 6(b)) is selected in step S16, and an engine torque reduction instruction signal is output in step S17.

Figure 5:
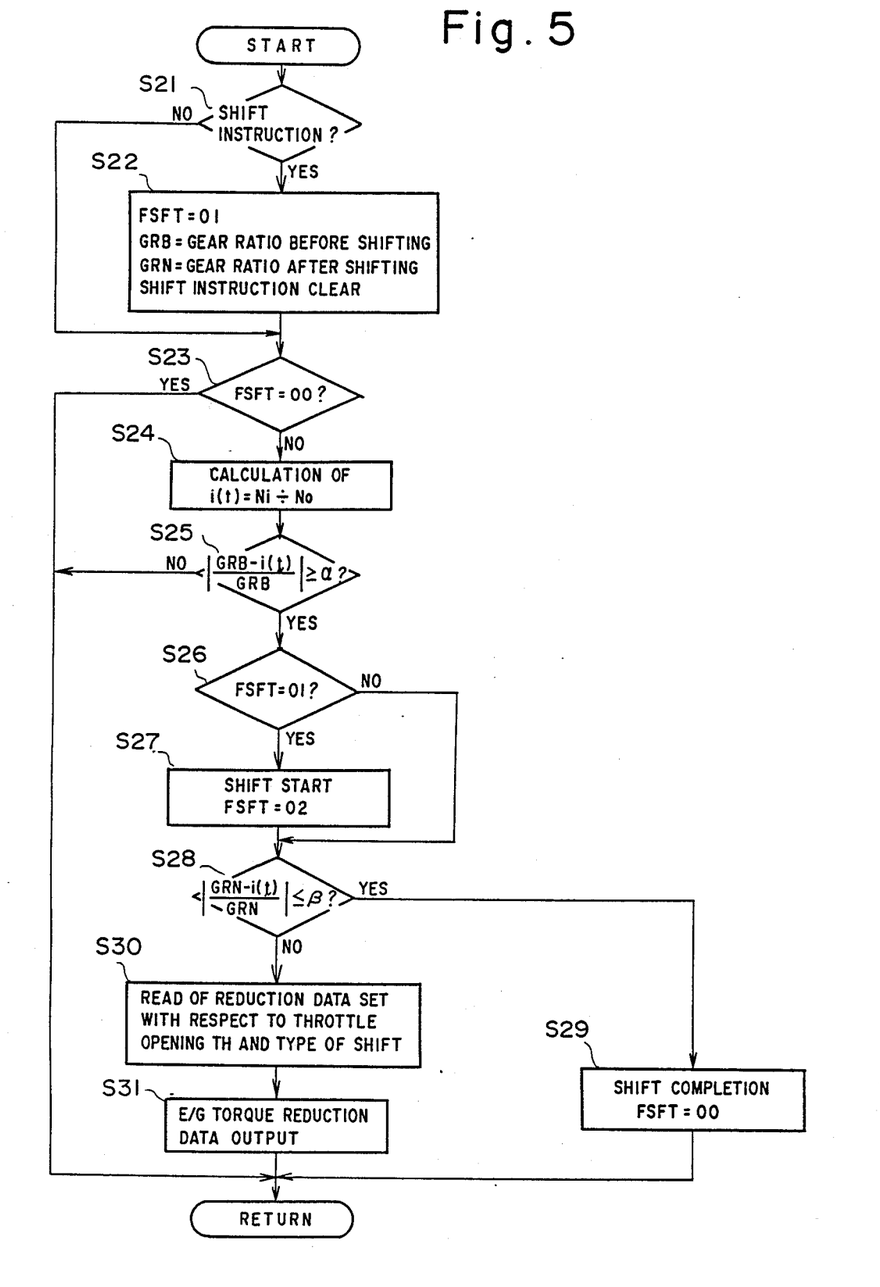
FIG. 5 is a flow chart of the engine torque control procedure including details thereof.

Next, operations of the CPU corresponding to functions of engine torque control in step S5 will be described with reference to the operational flow shown in FIG. 5.

First, in step S21, whether or not a shift instruction has been given is checked. In the case of Yes, a shift state flag FSFT is set to 01 in step S22 in correspondence with a part of the process between the shift instruction and the start of the shift while a gear ratio GRB before the shift and a gear ratio GRN after the shift are set, thereafter erasing the shift instruction. This setting of gear ratios before and after the shift is performed by setting, in the RAM 10, data items relating to the desired shift and selected from items of data on gear ratios of respective shift stages stored in the ROM 9.

In step S23, whether or not the present state is non-shift state is checked, that is, decision is made as to whether or not the shift state flag FSFT is 00 which corresponds to the non-shift state. If it is thereby determined that the shift state flag FSFT is not 00, in other words, it represents the shift state, data detected by the transmission input speed sensor 1 is, in step S24, stored in the RAM 10 via the transmission speed signal converter circuit 5 while data detected by the transmission output speed sensor 2 is stored in the RAM 10 via the transmission speed signal converter circuit 6. The gear ratio $i(t) = N_i/N_o$ is calculated on the basis of these items of data.

In step S25, shift starting decision is made. That is, decision is made as to whether or not an absolute value obtained by dividing the difference between the gear ratio GRB before the shift and the gear ratio $i(t)$ by the gear ratio GRB before the shift is greater than a shift start decision reference value $\alpha$. That is, whether or not $|[GRB - i(t)]/GRB| \geq \alpha$ is checked. The shift start decision reference value $\alpha$ is previously stored in the ROM 9 and is read to the RAM 10 in this step S25 and used as data to for the decision.

If, in step S25, the start of the shift is decided, whether or not the shift state flag FSFT is 01 which corresponds to the part of the process between the shift instruction and the start of the shift is checked in step S26. If the shift state flag FSFT is 01, the shift is started in step S27 while the shift state flag FSFT is set to 02 which corresponds a part of the process between the start and end of the shift.

In step S28, a shift completion decision is made. That is, decision is made as to whether or not an absolute value obtained by dividing the difference between the gear ratio GRN after the shift and the gear ratio $i(t)$ by the gear ratio GRN after the shift is greater than a shift completion decision reference value $\beta$. That is, whether or not $|[GRN - i(t)]/GRN| \leq \beta$ is checked. The shift start decision reference value $\beta$ is previously stored in the ROM 9 and is read to the RAM 10 in this step S28 and used as data for the decision.

Figure 6A:
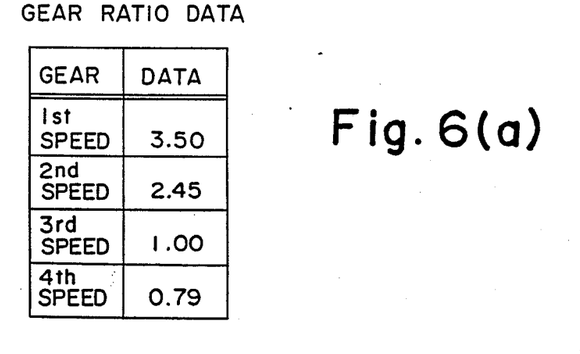
FIGS. 6(a) and 6(b) are tables of examples of data maps.
Figure 6B:
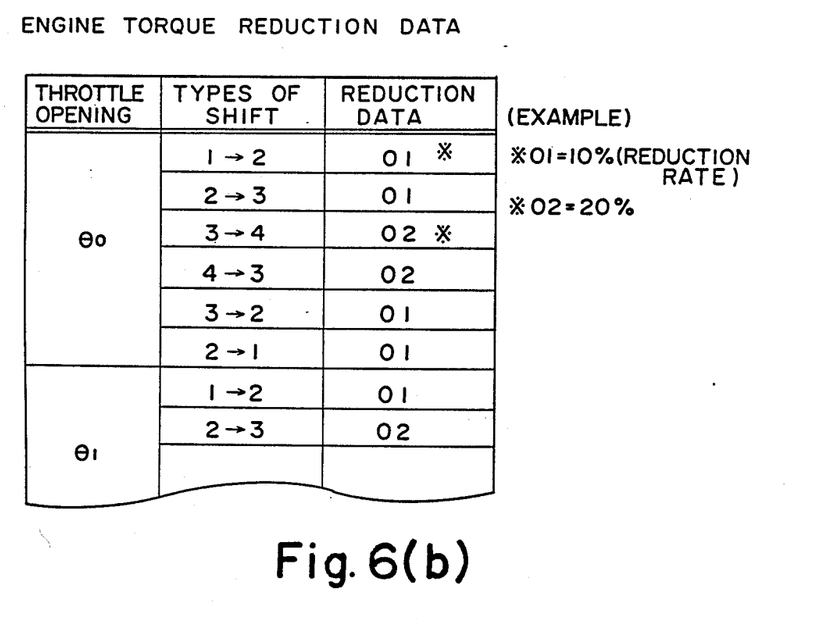

If, as a result of this step, shift completion is not decided, one of the reduction data items (FIG. 6(b) tabled in the ROM 9 with respect to the throttle opening TH and the types of shift (SHIFT) is read in step S30, and is supplied, in step S31, to the ECU 16 via the engine torque reduction instruction signal output circuit 13. If, in step S28, shift completion is decided, shifting is terminated in S29 while the shift state flag FSFT is set to 00 which corresponds to the non-shift state.

If, as described above, it is determined that the shift should be done, the shift solenoid is operated, thereby effecting the shift. The gear ratio $i(t)$ is calculated from the number of transmission input revolutions $N_i$ and the number of transmission output revolution $N_o$, and decision is made with respect to the start and end of the shift. To reduce the engine torque, the ECU 16, that is the means for effecting the reduction, is supplied with a signal representing a reduction in the engine torque previously stored in the ROM 9 in the ECT 4 in accordance with the type of the shift (SHIFT) and the throttle opening TH (FIG. 6(b)) for a period of time between the start and end of the shift. During this period, the ECU 16 reduces the engine output torque by the control of the ignition timing retardation angle or the fuel injection rate using a well-known means on the basis of the instruction signal supplied from the engine torque reduction instruction signal output circuit 13 of the ECT 4. The form of the signal supplied from the ECT 4 to the ECU 16 is based on, for example, a method of setting the reduction by a combination of on and off states of a plurality of signals, a method of setting the reduction by using a pulse width modulation signal, or a method of setting the reduction by the frequency of a signal. It is of course possible to combine the ECT 4 and ECU 16 to form one integrated electronic control unit in which the above-described various processing steps are conducted.

FIGS. 6 show examples of data maps stored in the ROM 9. That is, FIG. 6 (a) shows on gear ratios which are, for example, 3.50 at the first speed of the gear, 2.45 at the second speed, 1.00 at the third speed, and 0.79 at the fourth speed. FIG 6(b) shows the aforementioned engine torque reduction data items which are stored with respect to the types of shift (SHIFT) based on the throttle opening TH. If the throttle opening TH is $\theta_0$ and if the shift is of the first to second speed type, the amount of reduction in the engine torque is 10%.

The present invention is not limited to the abovedescribed embodiment and other various modifications based on the spirit of the present invention are also possible without departing from the scope of the present invention.

What is claimed is:

1. A method of controlling gearshift operation of a stepping-type transmission in a motor vehicle having an engine with a throttle and an electronic control unit with memory, wherein said transmission has a rotary input member and a rotary output member, said method comprising:
   (a) storing in said memory predetermined values for:
      i. throttle opening and rotational speed of said output member for various types of gearshift;
      ii. the gear ratio before GRB and the gear ratio after GRN the gearshift for the various types of gearshifts; and
      iii. amounts of engine torque reduction correlated with various values for throttle opening and types of gearshift;
   (b) detecting the throttle opening;
   (c) detecting the rotational speed of said rotary output member;
   (d) inputting the detected throttle opening and rotational speed of the output member into the memory and comparing said detected throttle opening and said detected rotational speed with the predetermined values for throttle opening and rotational speed in said memory to determine the type of gearshift to be performed;
   (e) generating a gearshift decision signal indicative of the type of gearshift determined in (d);
   (f) detecting the rotational speed of the rotary input member of the transmission;
   (g) calculating, as a first ratio i(t), the ratio of the detected rotational speed of the input member to the detected rotational speed of the output member;
   (h) initiating the signalled gearshift on the basis of said first ratio i(t) and the gear ratio GRB predetermined for the signalled type of gearshift and completing the signalled gearshift on the basis of said first ratio i(t) and the gear ratio GRN predetermined for the end of the signalled gearshift;
   (i) selecting from said memory an amount of engine torque reduction from among the predetermined values for amounts of torque reduction in accordance with the detected throttle opening and the signalled type of gearshift operation; and
   (j) reducing the torque output from said engine by said selected amount during the period between initiation and completion of the signalled gearshift.

2. A method according to claim 1, wherein said step (h) of initiating the gearshift operation comprises: calculating the difference between GRB and i(t) and dividing that difference by GRB and comparing the result of said dividing with a shift start decision reference value $\alpha$ for said signalled gearshift stored in said memory and initiating said signalled gearshift when said result equals or exceeds said $\alpha$.

3. A method according to claim 2, wherein said step (h) of completing the gearshift operation comprises: calculating the difference between GRN and i(t) and dividing that difference by GRN and comparing the result of said dividing with a shift end decision reference value $\beta$ for said signalled gearshift stored in said memory and completing said signalled gearshift when said result equals or falls below said $\beta$.

4. An electronic control apparatus for controlling gearshift operation of a stepping-type transmission in a motor vehicle having an engine with a throttle, wherein said transmission has a rotary input member and a rotary output member, said apparatus comprising:
   (a) a memory containing predetermined values for:
      i. throttle opening and rotational speed of said output member for various types of gearshift;
      ii. the gear ratio before GRB and the gear ratio after GRN the gearshift for the various types of gearshifts; and
      iii. amounts of engine torque reduction correlated with various values for throttle opening and types of gearshift;
   (b) a throttle sensor for detecting the throttle opening;
   (c) an output speed sensor for detecting the rotational speed of said rotary output member;
   (d) input means for inputting said detected throttle opening and said detected rotational speed into said memory for comparison with the predetermined values for throttle opening and rotational speed in said memory to determine the type of gearshift to be performed;
   (e) means for generating a gearshift decision signal indicative of the type of gearshift determined;
   (f) an input speed sensor for detecting the rotational speed of the rotary input member of the transmission;
   (g) means for calculating, as a first ratio i(t), the ratio of the detected rotational speed of the input member to the detected rotational speed of the output member;
   (h) means for determining initiation of the signalled gearshift on the basis of said first ratio i(t) and the gear ratio GRB predetermined for the signalled type of gearshift and completing the signalled gearshift on the basis of said first ratio i(t) and the gear ratio GRN predetermined for the end, of the signalled gearshift;
   (i) means for selecting from said memory an amount of engine torque reduction from among the predetermined values for amounts of torque reduction in accordance with the detected throttle opening and the signalled type of gearshift operation; and
   (j) means for reducing the torque output from said engine by said selected amount during the period between initiation and completion of the signalled gearshift.

5. An apparatus according to claim 4, wherein the rotary input member of the transmission is a drum of a clutch.

6. An apparatus according to claim 4, wherein the rotary output member of the transmission is an output gear.

7. The method of claim 10 wherein said i(t) is continuously calculated.

* * * * *